No. 825,509. PATENTED JULY 10, 1906.
B. F. BEANE & R. P. BENNETT.
FIRE ALARM SYSTEM.
APPLICATION FILED DEC. 7, 1905.

Witnesses
Inventors
B. F. Beane and
Roy P. Bennett,
by H. B. Willson
Attorney

No. 825,509. PATENTED JULY 10, 1906.
B. F. BEANE & R. P. BENNETT.
FIRE ALARM SYSTEM.
APPLICATION FILED DEC. 7, 1905.

Witnesses
Inventors
B. F. Beane and
Roy P. Bennett
by H. B. Wilson
Attorney

No. 825,509. PATENTED JULY 10, 1906.
B. F. BEANE & R. P. BENNETT.
FIRE ALARM SYSTEM.
APPLICATION FILED DEC. 7, 1905.

Witnesses
Inventors
B. F. Beane and
Roy P. Bennett
by H. B. Willson
Attorney No. 825,509. PATENTED JULY 10, 1906.
B. F. BEANE & R. P. BENNETT.
FIRE ALARM SYSTEM.
APPLICATION FILED DEC. 7, 1905.

Witnesses
Inventors
B. F. Beane and
Roy R. Bennett
by Attorney

No. 825,509. PATENTED JULY 10, 1906.
B. F. BEANE & R. P. BENNETT.
FIRE ALARM SYSTEM.
APPLICATION FILED DEC. 7, 1905.

Witnesses
Inventors
B. F. Beane and
Roy P. Bennett,
by H. B. Wilson
Attorney

UNITED STATES PATENT OFFICE.

BENJAMIN F. BEANE AND ROY P. BENNETT, OF NEW PARIS, OHIO.

FIRE-ALARM SYSTEM.

No. 825,509.

Specification of Letters Patent.

Patented July 10, 1906.

Application filed December 7, 1905. Serial No. 290,840.

*To all whom it may concern:*

Be it known that we, BENJAMIN F. BEANE and ROY P. BENNETT, citizens of the United States, residing at New Paris, in the county of Preble and State of Ohio, have invented certain new and useful Improvements in Fire-Alarm Systems; and we do declare the following to be a full, clear, and exact description of the invention, such as will enable others skilled in the art to which it appertains to make and use the same.

Our invention relates to improvements in electric fire-alarm systems especially adapted for small towns and villages.

One object of the invention is to provide a simple and efficient signal system of this character which may be operated from various points throughout the town by means of push-buttons, thermostats, or other circuit-closing devices and which when so operated will first simultaneously operate a general alarm at some central point and private or individual alarms at the homes of the firemen or at different engine-houses and then sound one or more times a signal which will indicate from what locality the mechanism has been set in operation.

With the above and other objects in view the invention consists of certain novel features of construction, combination, and arrangement of parts, as will be hereinafter described and claimed.

In the accompanying drawings, Fig. 3 is a top plan view of the same.

In the practice of our invention we provide a central station and a plurality of substations located at different points throughout the town and from which an alarm may be sent in to the central station or to any point located centrally in the town. At each of the substations is a circuit-closing device, which may be in the form of a push-button or the like, so as to be operated manually, or in the form of a thermostat or any other automatically-operated circuit-closer. These devices may be located at any convenient points, and the thermostatic circuit-closers are preferably located in stores, warerooms, elevators, flour-mills, and other places where an alarm will be quickly and automatically sounded in case of fire when the heat reaches a predetermined temperature.

Figure 2:
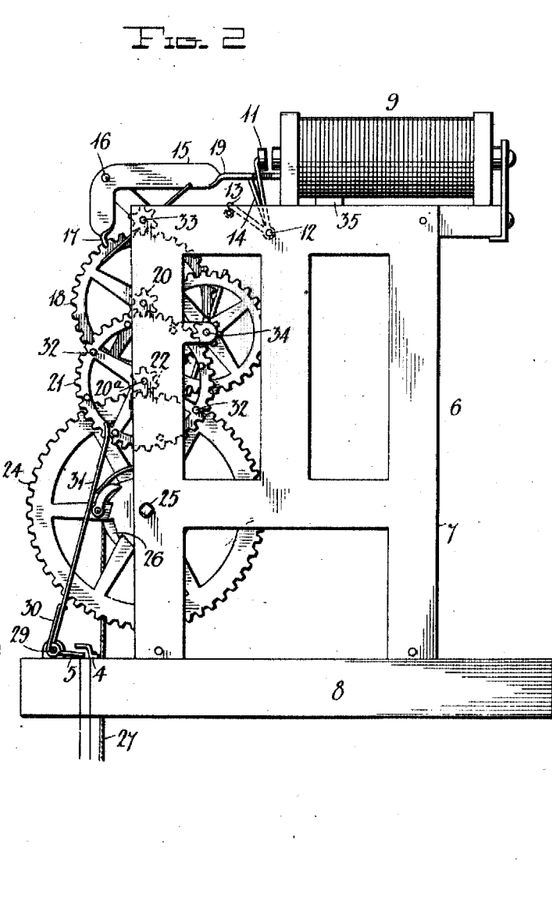
Fig. 2 is a side elevation of the mechanism for controlling the sounding of the general alarm and the individual alarms.
Figure 4:
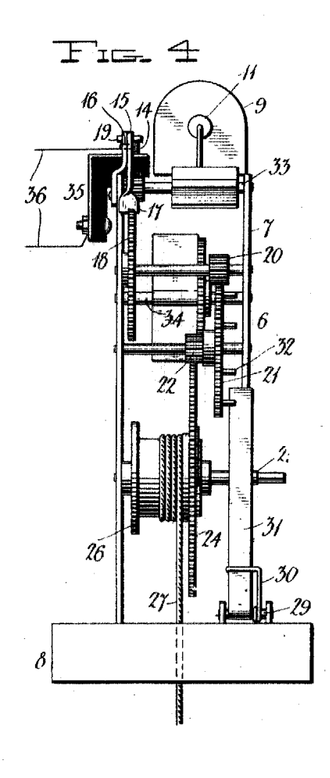
Fig. 4 is an end view of the same.
Figure 5:
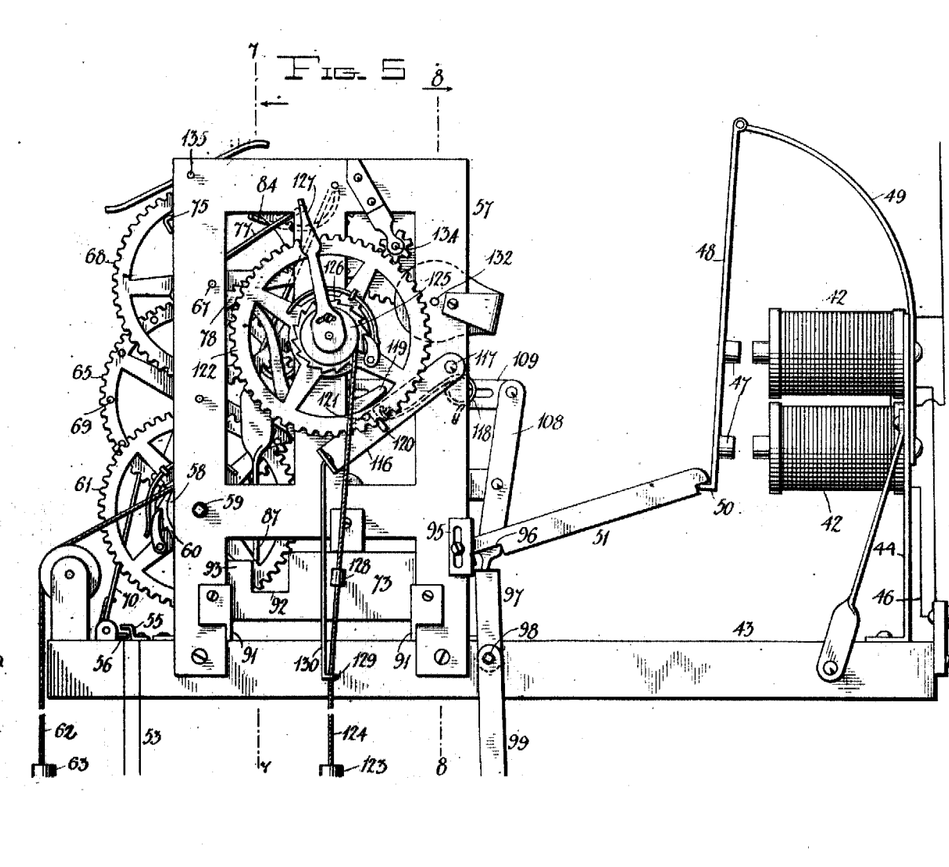
Fig. 5 is a side elevation of a mechanism for sounding the signal-alarm which indicates the locality from which the system has been set into operation.
Figures 6, 13, 14:
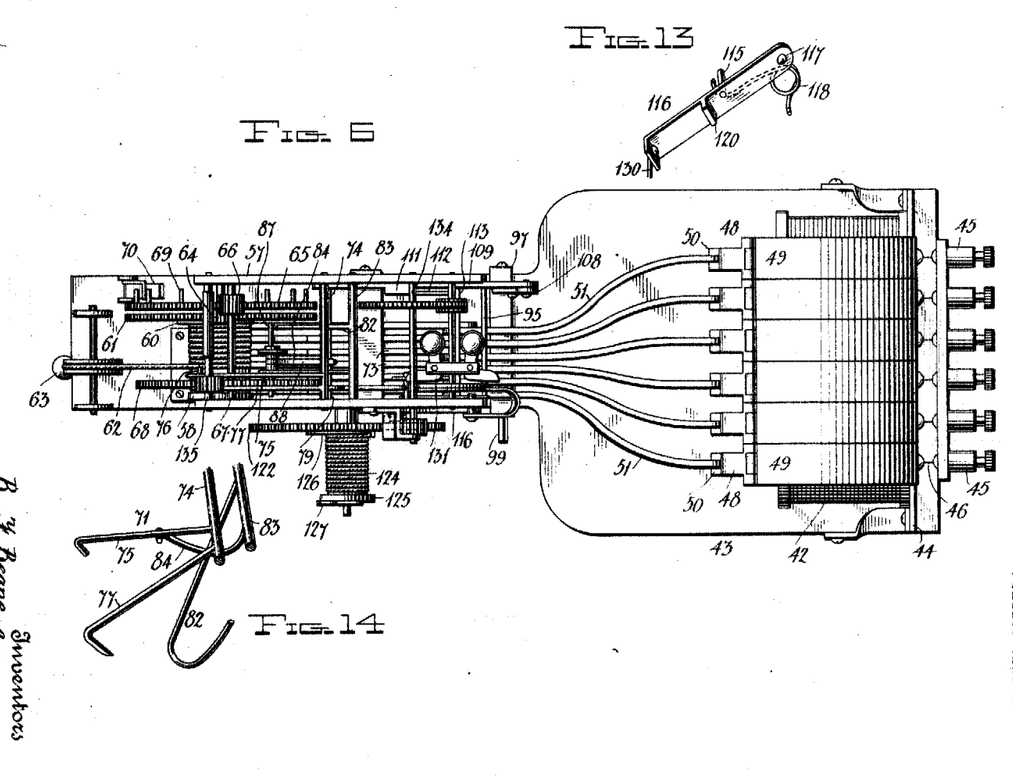
Fig. 6 is a top plan view of the same.
Fig. 13 is a perspective view of the lever which regulates the signal-repeating mechanism.
Fig. 14 is a perspective view of the detent device for holding the signal-operating mechanism against movement.
Figure 7:
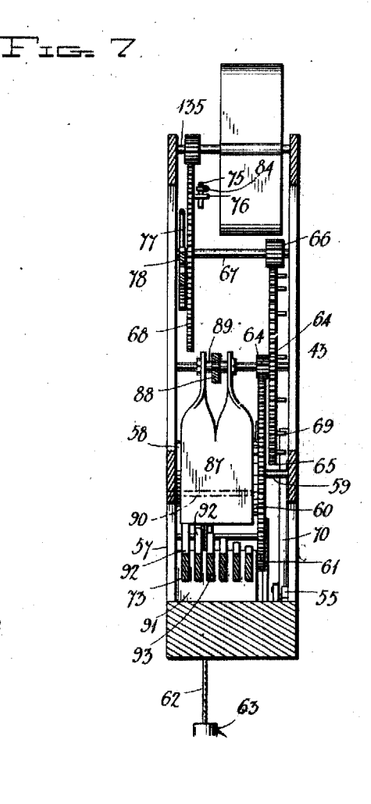
Figs. 7 and 8 are vertical transverse sectional views taken on the planes indicated by the lines 7 7 and 8 8 in Fig. 5.
Figure 8:
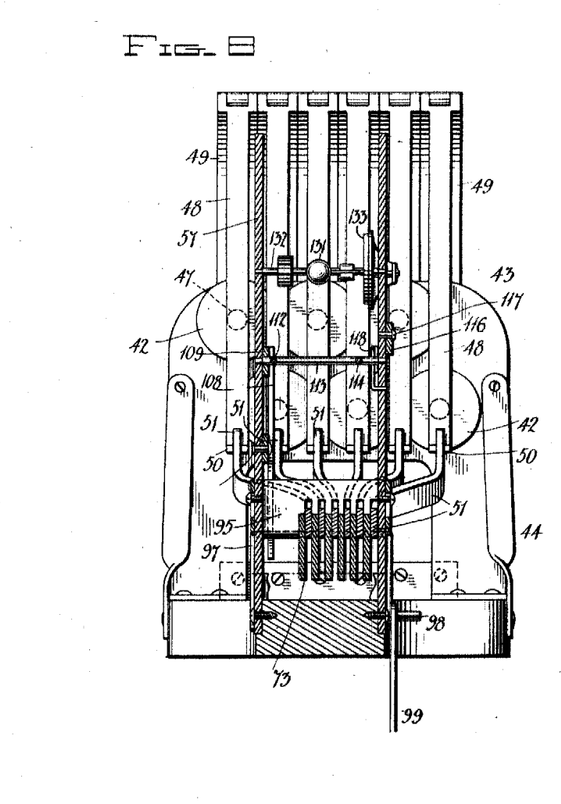
Figure 9:
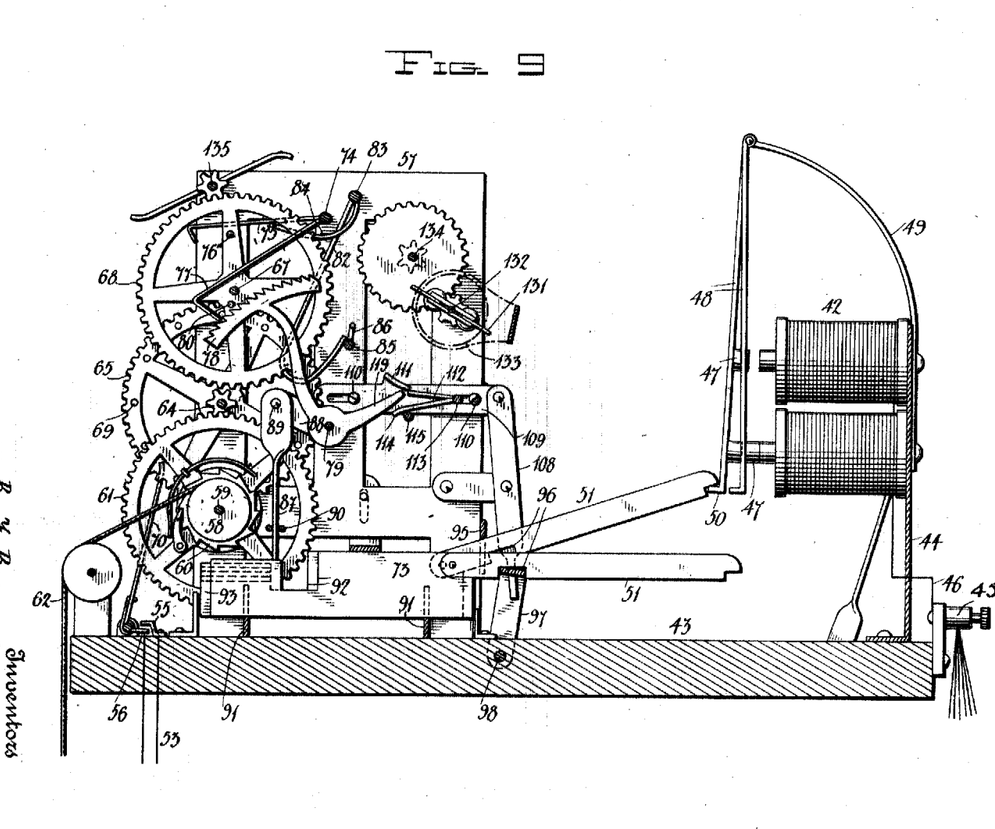
Fig. 9 is a vertical longitudinal sectional view.
Figure 10:
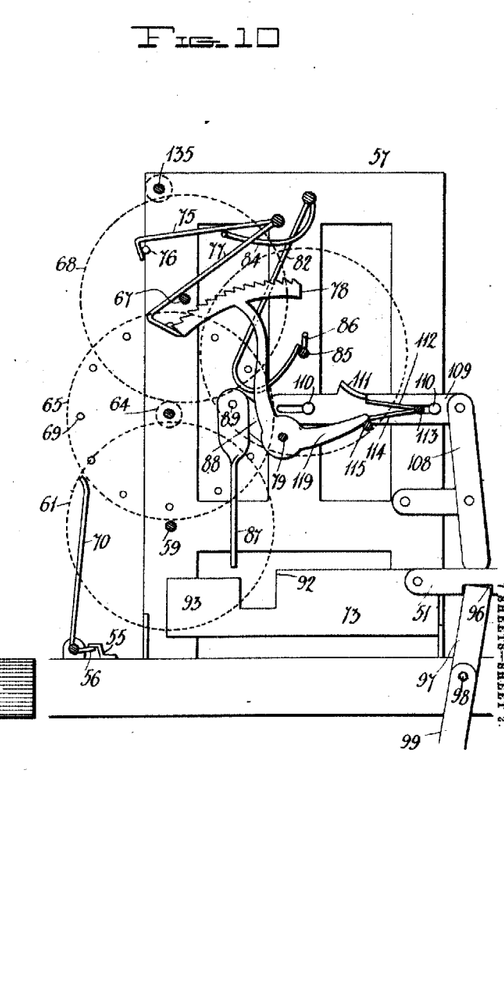
Fig. 10 is a detail view showing the operation of the controller for the signal mechanism.
Figure 11:
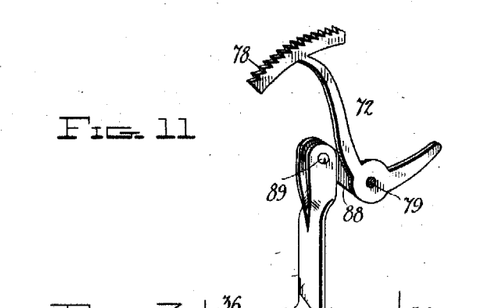
Fig. 11 is a perspective view of the controller.
Figure 12:
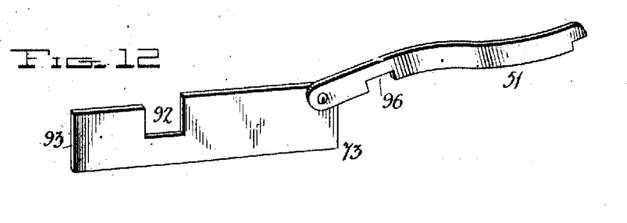
Fig. 12 is a similar view of one of the determining elements or slides which regulate the setting of the controller.

At the central station is mounted upon a tower, top of a building, or similar place a signaling device from which a general alarm is sounded whenever one of the circuit-closing devices at the substations is operated. This alarm device may be of any form and construction, but is here shown conventionally in the form of an electric bell 1, included in an electric circuit 2, which latter also includes a battery or generator 3 and contact-points 4 5. The latter are held normally separated, and the circuit is closed through them by the mechanism 6, which is clearly shown in Figs. 2, 3, and 4 of the drawings. This mechanism comprises a suitable frame 7, mounted upon a base 8, and having upon its upper portion an electromagnet 9, which is included in all of the circuits of the various circuit-closing devices 10, which are located at the different substations throughout the town. The armature 11 of the magnet 9 is secured upon a shaft 12, which is journaled in the frame 7 and has a stop-arm 13 to limit its movement by the action of gravity away from the magnet. The shaft 12 also carries a releasing-arm 14, which coacts with a trip-lever 15. The latter is of right-angular form and is pivoted at its angle at 16 upon the frame. Its vertical arm 17 is shaped to engage the teeth of a cog-wheel 18 when its opposite end 19 is supported by the engagement of the arm 14 therewith. The arm 14 thus supports the trip 15 when the armature 11 is away from the magnet 9; but as soon as the magnet is energized the arm 14 is swung to bring it into a recess formed in the arm 19 of the trip-lever, and thereby permit the latter to drop, so that its end 17 disengages the wheel 18. The shaft of the gear 18 carries a pinion 20, which meshes with a gear 21 upon a shaft 20ª. On the shaft of the gear 21 is a pinion 22, which meshes with a gear 24 upon a shaft 25. The latter extends through bearings in the frame and has upon one of its ends a polygonal-shaped portion to receive a winding-key or lever. Secured upon the shaft 25 by a pawl-and-ratchet connection is a winding-drum 26, upon which is wound a cord or similar flexible connection 27, which has upon its free lower end a weight 28. The descent of the weight 28 when the end 17 of the trip-lever 15 is disengaged from the gear 18 causes the train of gears previously described to rotate, and thereby alternately make and break the circuit through the contact-points 4 5. The latter is in the form of a right-angular lever or arm which is pivoted at its angle, as shown at 29, and actuated by the spring 30, so that its upper spring-arm 31 is held in the path of a plurality of pins or projections 32, arranged around one face of the gear-wheel 21. It will be seen that as these projections 32 successively engage the arm 27 the contact-point 5 will be moved into and out of engagement with the contact-point 4 to close and open the circuit 2, and hence sound the general alarm 1. In order to retard the descent of the weight 28, we may provide in the frame 7 fan-shafts 33 34, which are geared by means of pinions to the gear-wheels 18 and 21.

When the electromagnet is energized and attracts its armature, so that the arm 14 releases the end 19 of the trip-lever 15, said end 19 engages a contact-point 35 and closes an electric circuit 36, which includes a battery or generator 37, an electric lamp 38, a plurality of private or individual alarm devices 39, the arm 19, and the contact-point 35. This point 35 is secured upon and insulated from the frame 7 immediately below the end 19 of the trip-lever, which end is preferably weighted, as shown. The electric lamp 38 may be employed or omitted, as desired, and when used is adapted to illuminate an annunciator 40, which is included in the circuits of the circuit-closing devices 10 and which is adapted to indicate from which of said devices the alarm is turned in. The private or individual alarm devices 39 are here shown in the form of electric bells which are connected up in series; but it will be understood that signal or alarm devices of any other form and construction may be used. These alarm devices 39 are located in the homes of the firemen, in different enginehouses, or at any other points where it is desired to sound a private or individual alarm. It will be seen that when the trip-lever 15 is operated its end 17 will release the general-alarm mechanism, so that a general alarm will be sounded, and its end 19 will close the circuit 36 and simultaneously sound the individual alarms 39.

As previously stated, the circuit-closing devices 10 may be of any form and construction, and in the circuit of each one is included the annunciator 40, a battery or generator 41, the electromagnet 9, and one of a plurality of electromagnets 42, which are mounted in the mechanism 43, which sounds the number of the substation at which the device 10 is located and which is clearly shown in Figs. 5 to 14, inclusive, of the drawings. One of the electromagnets 42 is provided for each of the substations or circuit-closing devices 10, and they are preferably mounted in horizontal rows upon a supporting-frame 44, which is mounted upon a suitable base, suitable binding-posts 45 being provided upon said base to connect one terminal 46 of each of the coils of the magnets to one of the circuit-wires of one of the devices 10. The other terminals of the said magnets are united to one of the conductors of the battery 41. The armatures 47 of these electromagnets are carried by swinging levers 48, which are hingedly mounted at their upper ends upon suitable supporting arms or brackets 49, provided upon the frame 44. The lower and outer ends of the armature-levers 48 are formed with projections or hooks 50, which are adapted to support the notched ends of pivoted arms 51, the purpose of which will be presently explained.

Figure 1:
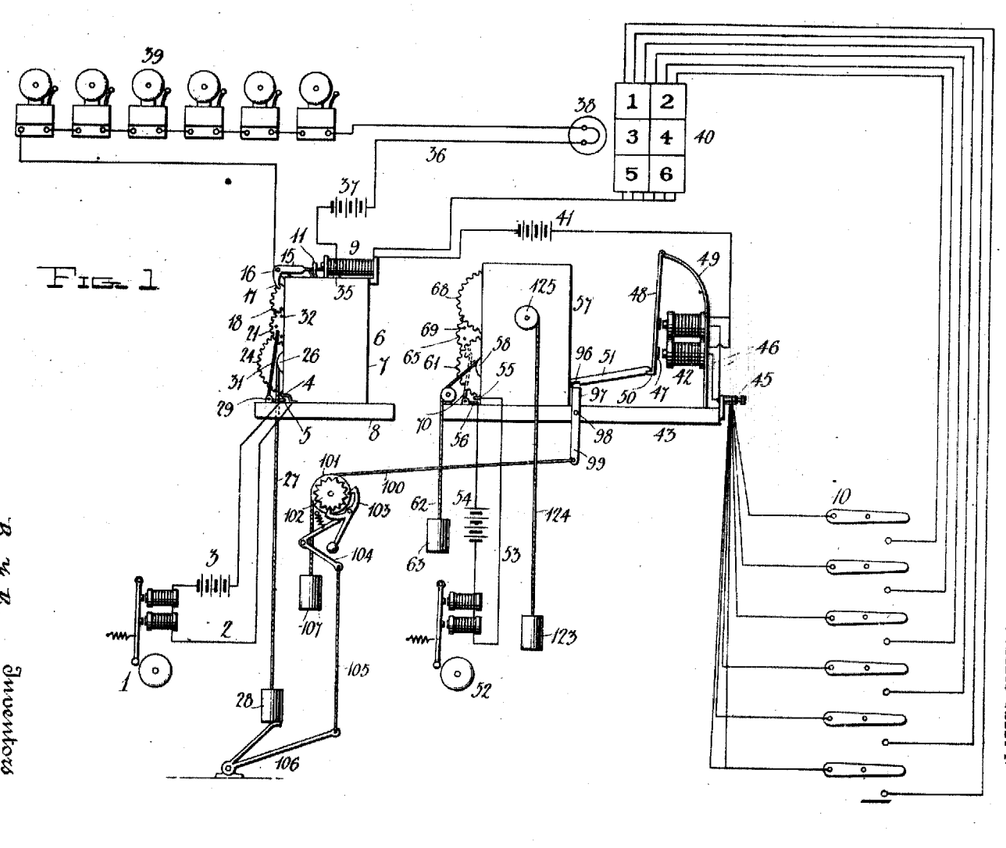
Figure 1 is a diagrammatic view of our improved alarm and signal system.

The mechanism 43 controls the sounding of a signal which indicates from what substation or locality the alarm is turned in, and this signal is preferably given by sounding a suitable bell or gong a number of times corresponding to the number of the substation from which the system is set into operation. As shown in Fig. 1, we provide for this purpose an electric bell 52, which is included in an electric circuit 53, which also includes a battery or generator 54 and two contact-points 55 56. The latter is similar in form to the contact-spring 25, previously described, and it is actuated by a similar mechanism, which is mounted in a suitable frame 57. This mechanism comprises a winding-drum 58, which is loosely mounted upon a shaft 59, which is adapted to be locked to rotate therewith in one direction by means of a pawl-and-ratchet connection 60, which is provided between it and a gear-wheel 61, which is secured upon said shaft 59. Wound upon the drum 58 is a cable 62, which passes over a suitable guide and has upon its free end a weight 63. As the latter descends it unwinds the cable from the drum 58 and rotates the shaft 59 to operate the indicating-alarm mechanism previously explained. The cable may be rewound upon the drum by applying a key or lever to the polygonal-shaped outer end of the shaft 59. The gear 61 meshes with a pinion 64 upon a shaft which also carries a gear-wheel 65. The latter meshes with a pinion 66 upon a shaft 67, to which is secured a rotary wheel, gear, or similar element 68. Upon one face of the gear 65 are a plurality of projections or pins 69, which are adapted to successively engage and operate the end 70 of the right-angularly-shaped spring-actuated contact device 56, which is pivotally mounted, as shown. It will thus be seen that the circuit 53 will be alternately opened and closed to sound the bell 52 while the mechanism just described is in operation. The length of time during which this mechanism is permitted to operate determines the number of times the bell 52 is sounded, and in order to cause this mechanism to be automatically started and stopped we provide means for unlocking and locking the gear or rotary element 68. This mechanism, which is clearly shown in Figs. 10 to 14 of the drawings, comprises a detent device 71, a controller 72, and a plurality of determining elements or slides 73, which determine the extent of movement of the controller and which carry the arms 51. The detent device 71 comprises a shaft 74, which is mounted in the frame 57 and which carries an arm 75, having a hook at its outer end to engage a pin 76, provided upon one face of the gear or wheel 68. The shaft 74 also carries a pawl-arm 77, which engages and is supported by the teeth of a segmental rack 78, which is provided upon the controller 72. The latter is in the form of a lever, which is secured upon a shaft 79 and has the rack 78 upon one of its ends. The segmental rack 78 is disposed concentric with the pivot 79, and it is adapted to be engaged by a pin 80, which is provided upon one face of the gear or wheel 68. By means of this construction it will be seen that upon each rotation of the wheel 68 the pin 80 will engage one of the teeth of the rack 78 and move the latter the distance of one tooth, where it will be held by the pawl 77. The engagement of the pawl with the rack supports the hook-arm 75 out of the path of the pin 76 upon said wheel 68; but as soon as the pawl 77 drops in rear of the last tooth of the rack 78 it will lower to a greater extent and will allow the hook-arm 75 to swing into the path of said pin 76, and thereby hold the wheel 68, and hence the indicating-signal-operating mechanism, against further movement.

The hook-arm 75 is adapted to be elevated to release the pin 76, and hence permit the alarm mechanism to start, by means of a swinging arm 84, which is carried by a shaft 83 and which is adapted to engage the arm 75 upon the shaft 74. The shaft 83 also carries an arm 82, which has its curved lower end supported upon a shaft 85, which carries a projection or arm 86, adapted to actuate the arm 82 to cause it to actuate the arm 84, and hence the arms 75 and 77, the former releasing the signal mechanism and the latter releasing the controller 72 to permit the same to drop a distance which is regulated by the determining elements or slides 73. These slides or elements 73 limit the downward movement of the controller or lever 72 by the engagement with one of them of a drop-lever 87, which is carried by the lever 72 or by an arm 88, secured upon the shaft 79. This drop-lever 87 is pivotally mounted, as at 89, and hangs vertically, so that it slides between two guide projections 90, provided upon the frame 57, as shown. The determining elements or slides 73 are in the form of metal plates, which are mounted to slide longitudinally in guides 91, provided upon the frame 57. These plates are of rectangular form and have formed in their upper edge adjacent to their outer ends alining notches or recesses 92, which are normally disposed beneath the lower end of the drop-lever 87.

The outer portions 93 of the different slides or elements 73 vary in height, so that when any one of the slides 73 is projected to cause its portion 93 to be below the drop-lever 87 the downward movement of the latter will be correspondingly limited. In this way the setting of the controller is regulated, so that the indicating-signal mechanism will be operated a predetermined time and will cause the alarm-bell 52 to be struck a number of times corresponding to the number of the substation which is in circuit with the electromagnet 42, that controls the projected slide or element 73. The slides 73 have pivotally connected to their rear ends the arms 51, which are adapted to be supported by the armature-levers 50, as previously stated. These arms are adapted to swing in a slotted guide 95, which is adjustably secured upon the frame 57, as shown. The said arms are held normally in their supported positions, and when one of the magnets is energized by closing the circuit at one of the substations its armature-lever is attracted, so that one of the arms 51 drops to a horizontal position, in which the notch or recess 96 in its under edge engages a projecting lever 97, which is mounted upon a shaft 98. This lever 97 is in the form of a three-sided frame, which has two of its sides secured to said shaft and its upper horizontal portion disposed normally beneath the alining notches 96 in the arms 51, so that as the latter are dropped they will engage said horizontal portion of the lever. When said lever 97 is oscillated, it will carry the arm 51 engaged with it, and hence the slide or element 73, which is attached to said arm, rearwardly, so as to bring the portion 93 of said slide beneath the lower end of the drop-lever 87.

The lever 97 is actuated by means of a lever 99, which is secured upon the shaft 98, and has connected to its lower end one end of a cord or cable 100. The latter is wound two or more times around a drum 101, which is mounted in a suitable support and has upon one of its ends a ratchet-wheel 102, which is controlled by an escapement anchor or verge 103. This verge is held normally in engagement with the wheel 102, so that the drum is prevented from rotating, by a trip-lever 104, which is pivotally mounted and has connected to one of its ends a chain or other flexible connection 105. The latter has its lower end connected to a lever 106, which is disposed in the path of the weight 28, which actuates the general-alarm mechanism. This lever 106 is so disposed that the weight 28 actuates it just before said weight reaches the limit of its downward movement, so that the indicating-signal mechanism which sounds the number of the station from which the alarm is turned in will be actuated immediately after the general and private alarms have been sounded. The lower free end of the cord or cable 100 has secured upon it a weight 107, which when the verge 103 is released by the trip 104 will descend and draw upon the lever 97 to swing the same and project whichever one of the determining elements or slides 73 which corresponds to the substation from which the alarm has been turned in, it being understood that the electromagnet 42, which is included in the circuit of the device 10 at the substation from which the alarm has been sounded, previously attracts its armature and permits the arm 51 supported thereby to drop to an operative position, so that the lever 97 will project the same. The movement of the lever 97 also releases the hook-arm 75 from the pin 76 and permits the signal mechanism to be set in operation to cause the bell 52 to be sounded a number of times corresponding to the number of the substation from which the alarm is turned in. This releasing mechanism comprises a lever 108, which is pivotally mounted intermediate its ends upon the frame 57 and has its lower reduced end projecting loosely into an opening formed in the lever 97.

The upper end of the lever 108 is pivotally connected to a sliding bar 109, which is slidably mounted upon one side of the frame by means of screws 110, which project through slots formed in said bar. This slide 109 has secured upon it a cam or trip projection 111, which coacts with an arm 112, secured upon a shaft 113. The latter has secured to it a second arm 114, which is adapted to engage a projection 115 upon a stop-lever 116. The latter is pivoted at one of its ends, as at 117, upon the frame 57 and is supported by a spring 118. Said spring engages the projection 115; which latter is adapted to be actuated both by the arm 114 and by the end 119 of the lever or controller 72, as presently explained. Said lever 116 is actuated by the downward movement of the arm 114 when the slide 109 is moved inwardly and its cam projection 111 rides over the arm 112 and depresses the latter. In the return movement of the slide 109 the cam projection passes under the arm 112 and does not actuate the same.

The stop-lever 116 has upon its outer face a stop or projection 120, which is held normally in the path of a projection 121, provided upon the inner face of a gear-wheel 122, which is secured upon the shaft 85. The latter shaft is actuated by the descent of a weight 123, which is secured upon one end of a cord, cable, or other flexible connection 124, wound upon a drum 125, which is mounted upon the outer end of the shaft 85 and locked to rotate therewith in one direction by a pawl-and-ratchet connection 126 between the gear-wheel 122 and said drum. It will thus be seen that when the lever 116 is swung downwardly to disengage the projection 120 from the stop or projection 121 upon the gear 122 the shaft 85 will be released, and the weight 123 will cause it to make a complete revolution, and thereby cause its arm 86 to engage the arm 82 and release the hook-arm 75 from the pin 76 upon the signal mechanism. After the signal mechanism has been thus started it continues to operate until the proper signal has been sounded and is then automatically stopped by the engagement of the hook-arm 75 with the pin 76; but in order to cause such signal to be repeated one or more times the arm 119 of the lever or controller 72 is so disposed that when the latter reaches the limit of its forward movement—that is, when the pawl 77 drops in rear of the last tooth of the rack 78—said end 119 will engage and depress the projection 115, and hence the stop-lever 116, which carries said projection. This movement of the lever will again release the gear 122, so that the weight 123 will rotate the shaft 85 and cause its arm 86 to again operate the arm 82 and start the indicating-signaling mechanism. This repeating of the signal may be done as many times as desired by winding the cord or cable 124 the desired number of times upon the drum 125.

The adjustment of the drum 125 may be indicated by a pointer or hand 127, which is adjustably secured upon said drum and which may coact with a suitable dial. (Not shown.) At a suitable point on the cord or cable 124 is provided a stop 128, which is adapted to engage an eye or loop 129, provided upon one end of a link 130. The cord or cable 124 passes through said eye, and the upper end of said link is connected to the lever 116, so that when the stop or ball 128 upon the cable engages the eye of said link the latter and the lever will be depressed and the weight supported to prevent further operation of the repeating mechanism.

In order to prevent too rapid rotation of the gear 122 and its shaft 85, we provide a governor 131, which is here shown in the form of two right-angular levers pivoted upon a cross-bar secured upon a shaft 132. Said levers have centrifugal weights on one end, and their opposite ends are adapted to engage a friction-disk 133, which is supported, by means of a spring, upon the frame 57. The shaft 132 is connected, by means of a pinion and gear, to a shaft 134, which is mounted in the frame and has a pinion at its outer end which meshes with the gear 122. Too rapid rotation of the signal mechanism may also be prevented by providing a fan-shaft 135 and gearing the same by means of a pinion to the wheel-gear 68.

The operation of the system is as follows: When one of the circuit-closing devices 10 is operated, an electric circuit will be completed through the conductors shown in Fig. 1, the annunciator 40, the battery 41, the electromagnet 9, and one of the electromagnets 42. The passage of the current through the annunciator will cause one of its pointers to indicate the substation or place from which the circuit is closed. When the magnet 9 is energized, its armature will be attracted so that the arm 14 will permit the end 19 of the trip-lever 15 to drop and swing the end 17 out of engagement with the gear 18, and thereby release the general-alarm mechanism. The latter will be sounded as the descent of the weight sets the train of gears in motion and causes the contact 5 to make and break the circuit 2, and thereby sound the general-alarm bell 1. The dropping of the end 19 of the trip-lever 15 also completes the electric circuit 36 through the contact-point 35 and causes the electric light 38 to be lighted, so that the annunciator 40 may be readily read, and also causes the private or individual alarms 39 to be sounded at the homes of the firemen or at other points. When the magnet 42, included in the circuit of the device 10, which is operated, is energized, its armature will be attracted and will permit the arm 51, by which it is supported, to drop so that the notch or recess in said arm will engage the lever 97. The latter will be operated to project said arm and its attached determining element or slide 73 as soon as the weight of the general-alarm mechanism reaches the limit of its downward movement and swings the lever 106 to cause the trip 104 to release the verge 103, which locks the drum 101. As soon as this is released the verge 103 will operate to permit the weight 107 to descend gradually and draw upon the cable 100 and the lever 97, which latter is connected to the lever 97 through the shaft 98. The movement of the lever 97 is imparted through the lever 108 to the slide 109, which latter as it is moved inwardly causes its cam 111 to ride over the arm 112 and depress the latter, and hence the arm 114, which latter through its engagement with the projection 115 moves the stop-lever 116 downwardly to release the gear 68. When the latter is released, the weight 123 will descend and rotate the drum 125, and hence the shaft 85, until the arm 86 upon the latter engages the arm 82 and causes it to release the signal mechanism by disengaging the arm 75 from the pin 76. As the arm 75 is elevated the pawl 77 is also elevated, so that the controller or lever 72 is permitted to swing downwardly until its stop-lever 87 engages the portion 93 of the projected slide 73. This downward movement of the lever 87 varies according to the height of the portion 93, and hence the controller 72 and its rack 87 drop to a greater or less extent beneath the pawl 87, which extent varies according to the length of time the alarm mechanism is to operate, and hence the number of times the bell 52 is to be sounded. When the wheel 68 is released, the descent of the weight 63 will rotate the train of gears between said wheel and the gear 61, and the contact-point 56 will be moved into and out of engagement with the contact-point 55, so that the circuit 73 will be opened and closed to sound the bell 52. As previously stated, this bell is sounded as many times as the number of the substation from which the alarm is sounded, and this number may be repeated as many times as desired. Each revolution of the wheel 68 will cause its pin 80 to move the rack 78 the distance of one tooth, the pawl 77 preventing retrograde movement of the rack, and when said pawl drops in rear of the last tooth in said rack the arm 75 is permitted to drop into the path of the pin 76, so that the alarm mechanism will be automatically stopped. When this occurs, the end 119 of the controller or lever 97 engages the projection 115 and depresses the lever 116 to disengage its stop 120 from the projection upon the gear 122, so that the latter is again released to permit the weight 123 to descend and cause another revolution of the shaft 85. When the shaft 85 is again revolved, its arm 86 will engage the trip-arm 82, so that the signal mechanism will be again set in operation, as previously stated.

While we have shown and described the general-alarm mechanism and the signaling mechanism mounted in separate frames and upon separate bases, it will be understood that they may be combined and mounted in a single framework or structure. Instead of having simply the one general-alarm bell or device provided especially for that purpose, it will be understood that one or more bells in the town which are already erected for other purposes may be used for giving the general alarm by providing them with electrically-operated hammers, so that there will be no interference with the ringing of such bells in the regular manner.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In an alarm system, the combination of an automatically-acting general-alarm mechanism, a stop therefor, electrically-operated means to operate the stop to release said general-alarm mechanism, an automatically-acting indicating alarm mechanism, a stop therefor, a controller for said indicating alarm mechanism, determining devices to coact with the controller for the purpose set forth, and electrically-operated means to control the action of said determining devices and of said stop mechanism, substantially as described.

2. In an alarm system, the combination of an automatically-acting general-alarm mechanism, a stop therefor, electrically-operated means to operate the stop to release said general-alarm mechanism, an automatically-acting indicating alarm mechanism, a stop mechanism therefor, a controller for said indicating alarm mechanism, determining devices to coact with the controller, and electrically-operated means in circuit with the first-named electrically-operated means to control the action of said determining devices and of said stop mechanism, substantially as described.

3. In an alarm system, the combination of an automatically-acting general-alarm mechanism, a stop therefor, electrically-operated means to operate the stop to release said general-alarm mechanism, an automatically-acting indicating alarm mechanism, a stop mechanism therefor, a controller for said indicating alarm mechanism, determining devices to coact with the controller, and a plurality of independent electrically-operated means, each in circuit with the first-named electrically-operated means, to control the action of said determining devices and of said stop mechanism.

4. In an alarm system, the combination of a general-alarm mechanism, an indicating alarm mechanism, means to cause the action of the latter to be controlled by the former, electrically-operated means to set the general-alarm mechanism in operation, and determining means having an electrically-operated element to control the action of the indicating alarm mechanism.

5. In an alarm system, the combination of a general-alarm mechanism, an indicating alarm mechanism, means to cause the action of the latter to be controlled by that of the former, electrically-operated means to set the general-alarm mechanism in operation, and determining means having an electrically-operated element in circuit with said electrically-operated means to control the action of the indicating alarm mechanism, substantially as described.

6. In an alarm system, the combination of an electric circuit including a general-alarm device, mechanism for making and breaking said circuit, a trip for locking said mechanism against movement, an electromagnet for operating said trip, mechanism for sounding indicating signals, electromagnets for controlling said signal mechanism, and a plurality of electric circuits, each including the first-mentioned electromagnet, one of the latter-mentioned electromagnets and a circuit-closing device.

7. In an alarm system, the combination of an electric circuit including a general-alarm device, mechanism for making and breaking said circuit, a trip for locking said mechanism against movement, an electromagnet for operating said trip, mechanism for sounding indicating signals, electromagnets for controlling said signal mechanism, a plurality of electric circuits, each including the first-mentioned electromagnet, one of the latter-mentioned electromagnets and a circuit-closing device, and means controlled by said general-alarm mechanism for actuating said indicating signal mechanism.

8. In an alarm system, the combination of an electric circuit including a general-alarm device, mechanism for making and breaking said circuit, a trip for locking said mechanism against movement, an electromagnet for operating said trip, mechanism for sounding indicating signals, electromagnets for controlling said indicating signal mechanism, a plurality of electric circuits, each including the first-mentioned electromagnet, one of the latter-mentioned electromagnets and a circuit-closing device, means controlled by said general-alarm mechanism for actuating said signal mechanism, and means for causing the signal sounded by said indicating signal mechanism to be repeated.

9. In an alarm system, the combination of an electric circuit including a general-alarm device, mechanism for making and breaking said circuit, a trip for locking said mechanism against movement, an electromagnet for operating said trip, an electric circuit including an indicating signal device, mechanism for making and breaking the last-mentioned circuit, means for locking the last-mentioned mechanism against movement, and means actuated by said general-alarm mechanism for releasing said locking means.

10. In an alarm system, the combination of a general-alarm device, means for causing the same to be actuated from different points, an indicating signal mechanism, means for locking said indicating signal mechanism against movement, means controlled by the general-alarm device for releasing said locking means, and means for causing said indicating signal mechanism to be stopped after being in operation a predetermined period of time.

11. In an alarm system, the combination of a general-alarm device, means for causing the same to be actuated from different points, an indicating signal mechanism, means for locking said indicating-signal mechanism against movement, means controlled by the general-alarm device for releasing said locking means, means for causing said mechanism to be stopped after being in operation a predetermined period of time, and means for causing the signal sounded by said signal mechanism to be repeated.

12. In an alarm system, the combination of a general-alarm mechanism, an indicating alarm mechanism, means to cause the action of the latter to be controlled by that of the former, determining means for said indicating alarm mechanism having an electrically-operated element, an individual-alarm circuit, a closer therefor, a stop for the general-alarm mechanism, and an electrically-operated device in circuit with said electrically-operated element to operate said stop and said individual-alarm-circuit closer.

13. In an alarm system, the combination of an alarm mechanism, a controller therefor, a plurality of independently-operated determining devices to limit the action of the controller, common means to operate the determining devices, an element connected to each of the determining devices to connect it to the common operating means, and independent electrically-operated means normally effective to disconnect one of said connecting elements from the common acting means, and each effective when electrically energized to connect said connecting means to said common operating means, substantially as described.

14. In an alarm system, the combination of an indicating signaling mechanism having a controller moved thereby, a plurality of slides to severally determine the extent of the movement of the controller, a common operating device for the slides, a stop for the said signaling mechanism released by said device, a plurality of electrically-operated releasers corresponding in number with the slides, and connecting devices for the several slides, normally held by the respective releasers, and serving when released thereby to connect the slides to the common operating device.

15. In an alarm system, the combination of a general-alarm mechanism, a stop therefor, electrically-operated means to release the stop, an indicating signaling mechanism having a controller moved thereby, a plurality of slides to severally determine the extent of the movement of the controller, a common operating device for the slides, a stop for the said indicating signaling mechanism released by said device, means controlled by the general-alarm mechanism to actuate the common operating device, a plurality of electrically-operated releasers corresponding in number with the slides and in circuit with the said electrically-operated means to release the said connecting devices for the several slides, normally held by the respective releasers, and serving when released thereby to connect the slides to the common operating device, substantially as described.

16. In an alarm system, the combination of a signaling device, an operating mechanism for the same, a controller for said mechanism, a plurality of determining elements for limiting the movement of said controller, a plurality of electromagnets, swinging armatures for said magnets, swinging arms carried by said magnets and adapted to be supported by said swinging armatures, and means for actuating said arms and elements when released by said armature.

17. In an alarm system, a signaling mechanism comprising a rotary signal-actuating element, a trip for holding said element against movement, a controller actuated by said element and adapted to control said trip device, a plurality of slides to coact with said controller to limit the movement thereof, means for operating said slides, and means for releasing said trip.

18. In an alarm system, a signaling mechanism comprising a rotary signal-actuating element, a trip for holding said element against movement, a controller actuated by said element and adapted to control said trip device, a plurality of slides to coact with said controller to limit the movement thereof, means for moving said slides to an operative position, a rotary element for actuating said trip device, a lever for holding said rotary element against movement, and means for operating said lever to release said rotary element.

19. In an alarm system, the combination of a general-alarm mechanism, an indicating alarm mechanism, means to cause the action of the latter to be controlled by the former, electrically-operated means to set the general-alarm mechanism in operation, determining means having an electrically-operated element to control the action of the indicating alarm mechanism, and means to
5 cause the action of the indicating alarm mechanism to be repeated.

In testimony whereof we have hereunto set our hands in presence of two subscribing witnesses.

BENJAMIN F. BEANE.
ROY P. BENNETT.

Witnesses:
B. L. McKEE,
GEO. S. KESSLER.